United States Patent [19]
Thompson

[11] Patent Number: 6,094,880
[45] Date of Patent: Aug. 1, 2000

[54] STUD, TOP PLATE, AND RAFTER TIE DOWN

[76] Inventor: Thomas Thompson, 92-543 Kokole Pl., Makakilo, Hi. 96707

[21] Appl. No.: 09/058,764

[22] Filed: Apr. 11, 1998

[51] Int. Cl.[7] .................................................. E04B 1/38
[52] U.S. Cl. ........................ 52/712; 52/92.2; 52/713; 52/715; 52/702; 403/230; 403/232.1; 403/403
[58] Field of Search .............................. 52/702, 712, 713, 52/715, 92.2; 403/232.1, 218, 219, 230, 403

[56] References Cited

U.S. PATENT DOCUMENTS

| | | | |
|---|---|---|---|
| 625,427 | 5/1899 | Stewart et al. ................... | 403/232.1 X |
| 2,321,221 | 6/1943 | Linehan ................................ | 403/230 |
| 2,413,362 | 12/1946 | Maxwell et al. ...................... | 403/403 |
| 2,611,160 | 9/1952 | Hanesse ................................ | 403/237 |
| 2,911,022 | 11/1959 | Brown ................................. | 403/230 X |
| 3,188,696 | 6/1965 | Earhart ................................. | 52/712 X |
| 3,537,221 | 11/1970 | Helfman et al. ................. | 403/232.1 X |
| 4,713,923 | 12/1987 | Sielaff et al. ............................ | 52/713 |
| 4,896,985 | 1/1990 | Commins ......................... | 403/232.2 X |
| 4,976,085 | 12/1990 | Kruger ...................................... | 52/715 |
| 5,109,646 | 5/1992 | Colonias et al. ........................ | 52/712 |
| 5,390,460 | 2/1995 | Llorens ................................. | 52/715 X |
| 5,423,156 | 6/1995 | Nellessen, Jr. ............................ | 52/715 |
| 5,448,871 | 9/1995 | Newman et al. ......................... | 52/712 |
| 5,640,822 | 6/1997 | Haswell .................................. | 52/712 |
| 5,732,524 | 3/1998 | Kalker et al. ............................ | 52/712 |

FOREIGN PATENT DOCUMENTS

| | | | |
|---|---|---|---|
| 185694 | 9/1922 | United Kingdom | ................ 403/232.1 |
| 2222221 | 2/1990 | United Kingdom | ................ 403/232.1 |

OTHER PUBLICATIONS

"TECO Procucts, Structural Wood Fasteners", TECO Publication No. 101, 15 page Brochure, Jun. 1972.

Maher, Arthur, "Engineered Nailing Simplifies Framing", Popular Mechanics, pp. 137–140, Aug. 1964.

Primary Examiner—Laura A. Callo

[57] ABSTRACT

A metal connector that securely ties together the structural members of the roof and wall on a wood frame house. The connector correctly places each structural member for maximum structural integrity. The connector has a large surface area for maximum strength, and precise nail holes to avoid splitting and assuring correct attachment to the structural member. The connector grasps the structural members to avoid detachment of any structural members during hurricanes. The connector has tabs and gussets to avoid twisting, lateral forces, thrusting, and uplift. The connector helps form the roof to wall connection into a strong shear wall to avoid building damage during earthquakes.

8 Claims, 17 Drawing Sheets

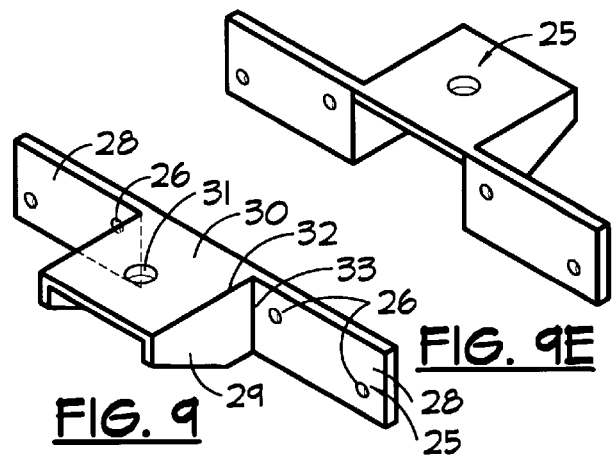
FIG. 9  
FIG. 9E
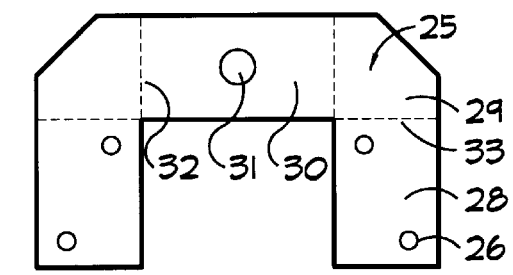
FIG. 9A
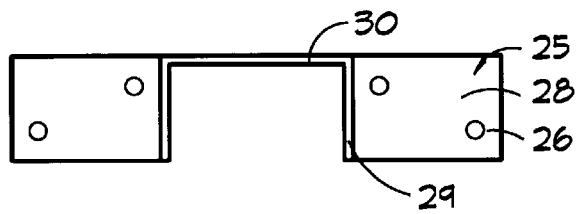
FIG. 9B
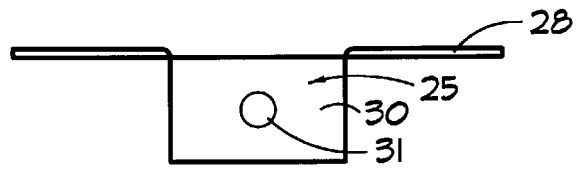
FIG. 9C
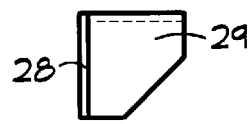
FIG. 9D

FIG. II

STUD, TOP PLATE, AND RAFTER TIE DOWN

BACKGROUND—FIELD OF INVENTION

This invention relates to an innovative connector that positively holds together the roof and wall to create buildings that are stronger and more resistant to earthquakes, hurricanes, tornadoes, and strong winds.

BACKGROUND—DESCRIPTION OF PRIOR ART

1. Background

Recent studies of hurricane damage on wood-frame buildings indicate that the most extensive destruction to a house by strong winds, was when the roof was torn off and rain ruined everything in the house.

Roof sheathing ties all the rafters together on a wood frame house, and the roof sheathing ties all the roof trusses together when a wood-frame house is constructed with trusses. The roof sheathing helps prevent the trusses from racking, or tilting perpendicular to their length.

Sheathing that is tightly secured to the roof and subsequently fastened to the walls, helps transfer uplifting forces to the walls and henceforth to the foundation. If the roof sheathing fails, the trusses collapse, and the walls usually fall down as they can not stand by themselves against strong winds.

Failure and loss of the roof sheathing is common during hurricanes, mainly because of inadequate fastening of the roof sheathing to the underlying structural members. The roof system provides stability to a house by bracing the tops of exterior and interior load-bearing walls.

Sheet metal joints perform better than nailed joints in high winds and during seismic activity. Strong connectors, secured by well placed fasteners, will insure that the major structural members of a house, the roof and walls, are securely tied together.

Hurricanes

Studies of damage after Hurricane Andrew show several problems with the attachment of roof sheathing that this invention solves. Some sheets of roof sheathing that were blown off houses contained no nail holes, indicating that the sheet was placed in position, but was not nailed down. Some roofing sheets had nails in them that had missed the rafter that they should have been nailed upon. Some sheets had staples that had rusted away, and on some sheets the nails pulled out from the rafter.

The engineering staff of the American Plywood Association provided technical personnel to assess the damage from Hurricane Andrew in Florida. The majority of wood structural sheathing failures were attributed to improper connection details, and in every case investigated, the sheathing loss was a result of improper nailing (Keith, 1992).

These problems have not been solved because staples are still used to tie down roof sheathing. By looking at new construction, nails are still seen poking through the roof sheathing, completely missing the roof rafter. Most conscientious framers would drive another nail when they felt the nail miss the underlying rafter, but with the new powered nail guns, the framer can not tell if the rafter was missed because each shot feels the same, no matter what the nail is being driven into.

Earthquakes

During an earthquake, the wall and roof diaphragms undergo shearing and bending. The shear forces from the roof boundary members are transferred to the top of the shear wall (outside wall) by way of toenails or blocking to the top plate. To withstand and transfer the shear loads, plywood sheets have to be spliced together to prevent adjoining edges from sliding past or over each other (Gray, 1990).

Steel connectors, between different components of a wood-frame buildings superstructure, provide continuity so that the building will move as a unit in response to seismic activity (Yanev, 1974).

2. Prior Art

A number of connectors have been developed to tie together the structural members of a house under construction. Up until this invention, nobody had seen how to make a connection that could tie roof sheathing to the rafter, top plate, and wall stud.

A prior art roof securing system by Llorens, U.S. Pat. No. 5,390,460 ties down roof sheathing to a rafter. It does not tie the sheathing or rafter to the top plate or wall stud. Another sheathing strap by Nellessen, U.S. Pat. No. 5,433,156 shows a complicated apparatus for securing sheathing to a rafter. It also does not tie the sheathing or rafter to the top plate or wall stud.

None of the following straps tie down roof sheathing. A prior art truss anchor by Haswell, U.S. Pat. No. 5,640,822 ties down the rafter to a wall stud. His four embodiments (FIGS. 1–4) show the anchor attached to the thinnest and weakest edge of a wall stud. Any nails or screws would split the wood. FIGS. 1–3 show the anchor wrapped around a rafter next to the top plate. There is no attachment shown to the top plate, but it could only be attached to the thin edge.

Haswell's '822 is an improvement of the prior art shown in his FIG. 5, which is a TECO Ty Down Sr. or Simpson H2. Both the Ty Down Sr. and H2 have good uplift load values as shown in each companies catalog, but have no values for thrust or racking.

Haswell's '822 is also an improvement of the prior art shown in his FIG. 6, which is a Simpson H15, which is basically two connected H2's that wrap around and to either side of a rafter. It is rated high against uplift, and well against racking. It is not rated for thrust loads.

A prior art truss anchor by Kalker, U.S. Pat. No. 5,732,524 is similar to Haswell's '822 in that it ties into the thin weak edge of a wall stud and doesn't tie to the top plate.

Another truss hold down strap by Newman, U.S. Pat. No. 5,448,871 ties down a truss to the thin weak edge of a top plate. Uplift, thrust, and racking would be weak for this design.

A bearing connector by Colonias et al, U.S. Pat. No. 5,109,646 ties a truss to a top plate. This connector has a triangular-shaped design offering reasonable resistance to uplift, thrust, and racking.

A framing anchor by TECO called a Trip-L-Grip, ties a rafter to a top plate. It has a triangular member offering excellent resistance to racking and fair resistance to thrust and uplift.

No prior art was found that forms strong box work sections at the rafter, top plate, and stud wall connection like the present invention.

OBJECTS AND ADVANTAGES

Accordingly, several objects and advantages of my invention are that it helps secure the roof and wall of a building together, to keep the building from being destroyed by hurricanes, tornadoes, and earthquakes.

This invention helps prevent the wall of a building from detaching from the roof during a hurricane or earthquake. It makes the wall into a stable shearwall, transferring shear forces into the foundation and ground.

This invention helps prevent the roof of a building from detaching from the rafters or roof trusses, and prevents the roof from separating from the wall during a hurricane. It ties the roof sheathing securely to the underlying rafter or roof trusses, transferring lateral and uplift forces to the walls and to the foundation. It also makes sure that any forces transferred from the roof can be managed by the wall and transferred properly to the ground.

During an earthquake or a hurricane, a building with my invention will move as a sturdy unit, resisting and transferring destructive forces to the ground.

Mounted on the roof sheathing, wall stud, top plate, and rafter, my invention resists uplift, the most destructive force during a hurricane. During an earthquake, when my invention is mounted on the roof and walls, they will turn each member into a shear wall, with high resistance to racking.

This would improve the house beyond existing building codes, as sheet metal joints have been proven to perform better than nailed joints during hurricanes and earthquakes.

Another object of this invention is the large surface area. This area prevents the wood from splitting during nailing or during uplift or racking forces. The large surface area provides more strength in the connecting or hold-down process.

Still another advantage is the accurately placed nail holes on the invention. These nail holes prevent nails from splitting the underlying rafter and stud, by making the framer place nails at the correct and accurate location.

Another advantage is that some nails, on the invention, are driven into the strong broad side of a rafter, stud, or joist. The invention also wraps around different sides of each structural member, forming a very strong box like connection and preventing the nails from pulling out.

Yet another advantage of this invention is during earthquakes, nails can sometimes bend with the movements of the house, but screws often break. Even though screws hold tighter than nails and provide a tight connection against uplifting forces from hurricanes, they are less resistant against earth movements. This invention absorbs and transmits most of the forces during an earthquake and hurricane so nails and/or screws can be used as fasteners.

Another advantage is that since the invention absorbs and transfers earthquake and hurricane forces, less nails and nailing could be used. Also, screws could be used in the invention in earthquake areas with less fear that the heads will shear off.

Previously, only nails had to shear, but this entire connector must be sheared for the invention to fail.

Still another advantage is that with the roof sheathing firmly attached to the rafters, roofing material will now have a better chance of staying on during strong winds and earth movements. In addition, with the sheathing now firmly connected, new materials may be attached to the roof, such as solar electric panels, without fear of them being blown off with the sheathing.

In areas with brush or forest fire danger, fire-proof material or heavy material, such as tile, stone or metal, can now be applied to the roof with less danger of being blown or shaken off during earth tremors or high winds. With a very strong connection between the roof and wall, heavier loads can be placed on the roof.

Since the walls are now more resistant to racking, heavy fire-proof materials such as stucco or brick veneer can be applied to the wall sheathing with less chance of being shaken off during earth movements.

Earth tremors and hurricanes always destroy the weakest parts of a house. By making each envelope of a house, the vertical walls and roof envelope into a strong unit, there will be less damage.

Another advantage is that the building contractor or a building inspector can visually inspect the roof and wall for correct tie down, and can be assured that all the nails have been correctly placed. Previously, a visual inspection could not determine if the roof and wall was properly secured.

It is a further object of this invention that it easily, quickly, and economically protects houses from the destructive forces of earthquakes and hurricanes. It is a still further object that the connectors and fasteners are strong, attractive, permanent, functional, uncomplicated, simple to manufacture, easy to install, and economical. All of the embodiments can be made from a single sheet metal blank, without any welding.

A further object is that this invention can be used on various size sheathing, rafters, roof trusses, studs, wood or metal I-beams, TJI, and glue-lams, all made from wood or metal. There may be insurance discounts for homeowners who have this invention installed on their houses.

Previously, architects, engineers, and builders did not know how important the attachment of the roof to the top plate and wall stud was for avoiding and transferring forces during a hurricane or earthquake. It was thought that the weight of the roofing material would keep the roof attached during a storm. Prior to this invention, no thought had been given to having the roof and wall so tightly connected together, that they would form a shear wall during an earthquake.

Another advantage is that the rafter and wall stud will now line up to form a direct load path for uplift, thrust, and lateral loads. The metal connector will help direct and absorb these loads to make a house much more resistant to hurricanes and earthquakes.

These and other objectives of the invention are achieved by simple and economical connectors that allow a builder to quickly and easily secure the weakest parts of a building against earth tremors and high winds.

Advantages of each will be discussed in the description. Further objects and advantages of my invention will become apparent from a consideration of the drawings and ensuing description.

BRIEF DESCRIPTION OF THE DRAWINGS

FIG. 9 shows a front perspective view of a loader.

FIG. 9A shows a flat pattern layout of a loader.

FIG. 9B shows front view of a loader.

FIG. 9C shows a top view of a loader.

FIG. 9D shows a side view of a loader.

FIG. 9E shows a rear perspective view of a loader.

REFERENCE NUMERALS

Figure 1:
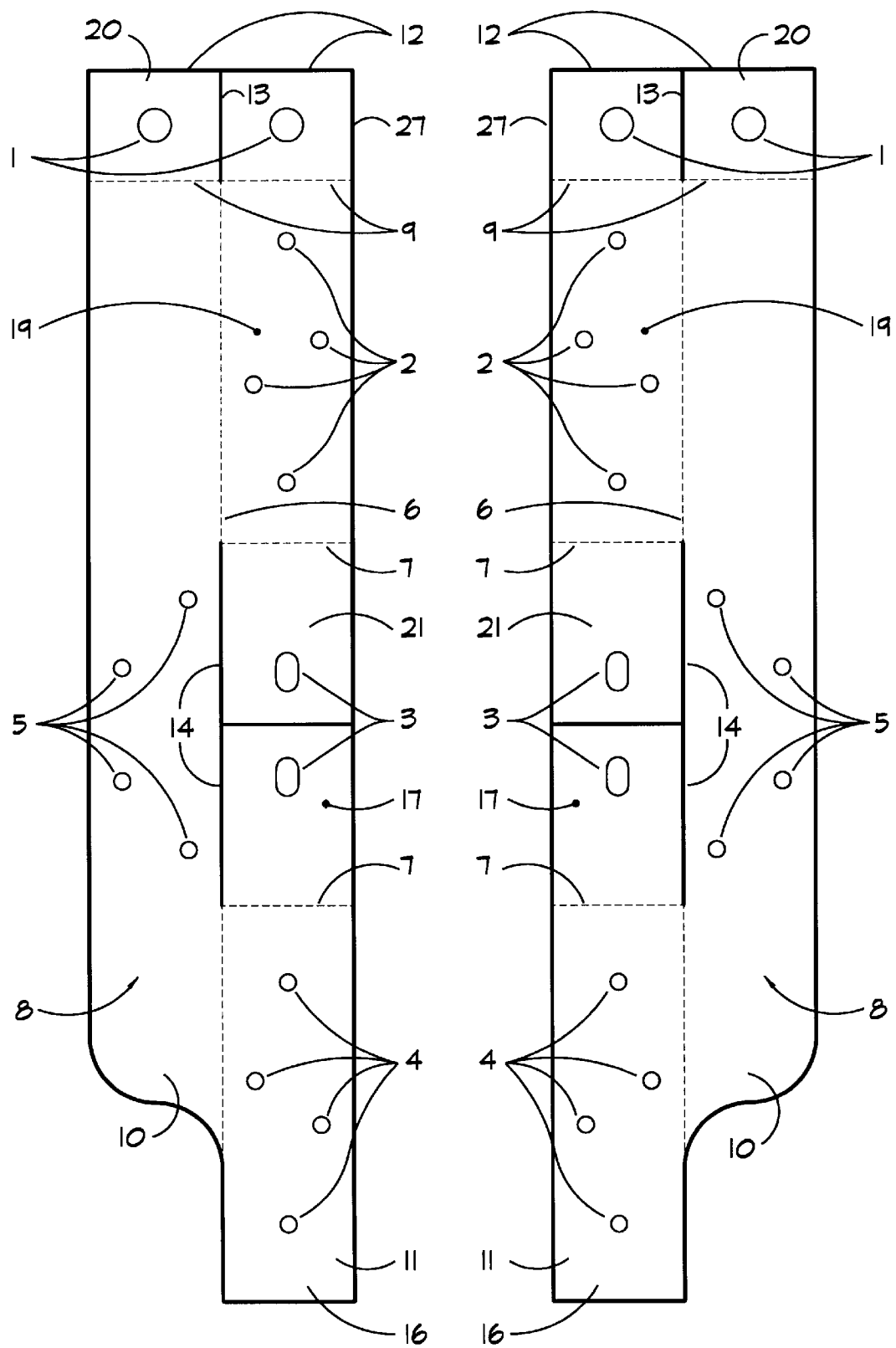
FIG. 1 shows a flat pattern layout of a left and right sandwich.

1. Bolt hole
2. Nail hole
3. Slot hole
4. Nail hole
5. Nail hole
6. Long bend
7. Gus bend
8. Sandwich
9. Top bend
10. Long side
11. Sheathing tie
12. Fold tab
13. Cut line
14. Cut line
15. Carriage bolt hole
16. Bottom-side tab
17. Bottom gusset
18. Carriage bolt
19. Top-side tab
20. Top tab
20A. Top tabber
21. Top gusset
22. Wall stud
23. Top plate
24. Rafter or truss
25. Topper
26. Nail holes
27. Roof sheathing
28. Wing
29. Side gusset
30. Top web
31. Bolt hole
32. Topper bend
33. Wing bend
34. One-piece sandwich
35. Angled one-piece sandwich
36. Crest
37. Angled bends
38. Sandwich sheathing tie
39. Sheathing bend
40. Sheathing tab
41. Nail hole
42. Span
43. Riser

FIG. 1

FIG. 1 shows a flat pattern layout of left and right sandwich 8. The left sandwich 8 is a mirror image of the right sandwich. The sandwich 8 consists of a rectangular long side 10 with nail holes 5 for attachment to a top plate 23. The top of the long side 10 has a bolt hole and top bend 9.

Along one long side of the long side 10, is a right-angle bend, the long bend 6 which forms the top side tab 19, and bottom side tab 16 at right angles to the long side 10.

The bottom side tab 16 has nail holes 4 for attachment to a wall stud 22. The top side tab 19 has nail holes 2 for attachment to a roof rafter or roof truss 24.

Between the top side tab 19 and bottom side tab 16, cut lines 14, parallel and perpendicular the long bend 6, form gussets with slot holes 3.

The top gusset 21 is formed by a right angled bend, the gus bend 7, from the bottom of the top side tab 19. The bottom gusset 17 is formed by a right angled bend, the gus bend 7, from the top of the bottom side tab 16.

Near the top of long side 10, and above the top side tab 19, a cut line 13 and right angle bends, the top bends 9 form a top tab 20 and fold tab 12. The top tab 20 is folded on top of the fold tab 12.

FIG. 2

Figure 2:
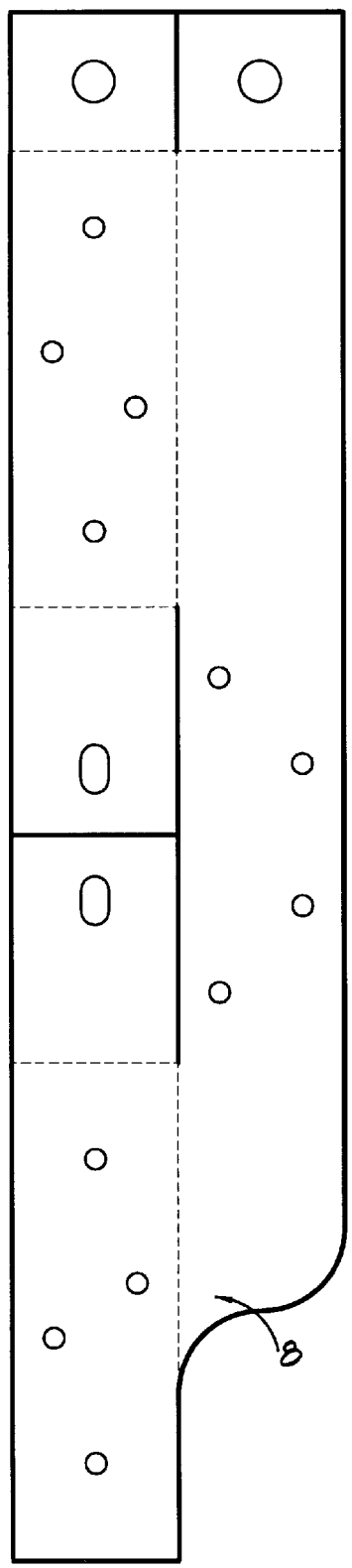
FIG. 2 shows a right sandwich prior to bending.

Refer now to FIG. 2 which shows a flat pattern layout of a right sandwich 8 without all of the reference numbers. This shows the cut lines, bend lines, and nail holes more clearly.

FIG. 3

Figure 3:
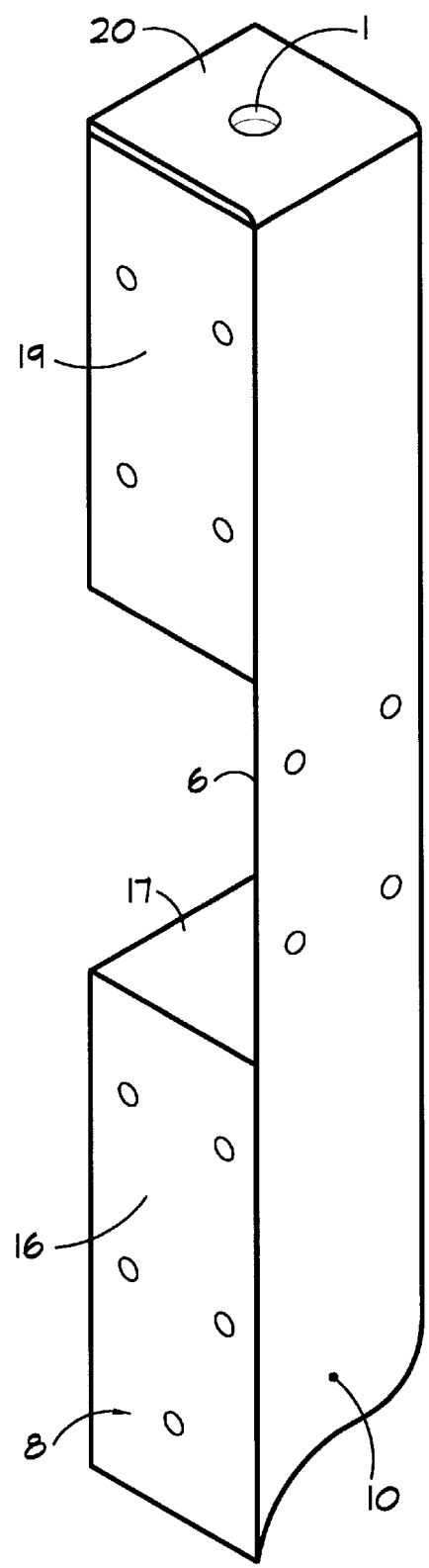
FIG. 3 shows a perspective view of right sandwich.

Refer now to FIG. 3 which shows a perspective view of a right sandwich 8 after cutting and folding. The top tab 20 is at the top, the long side 10 is to the right, the top side tab 19 is to the upper left, the long bend 6 is at the center, and the bottom gusset 17 is at the top of the bottom side tab 16.

FIG. 4

Figures 4, 5:
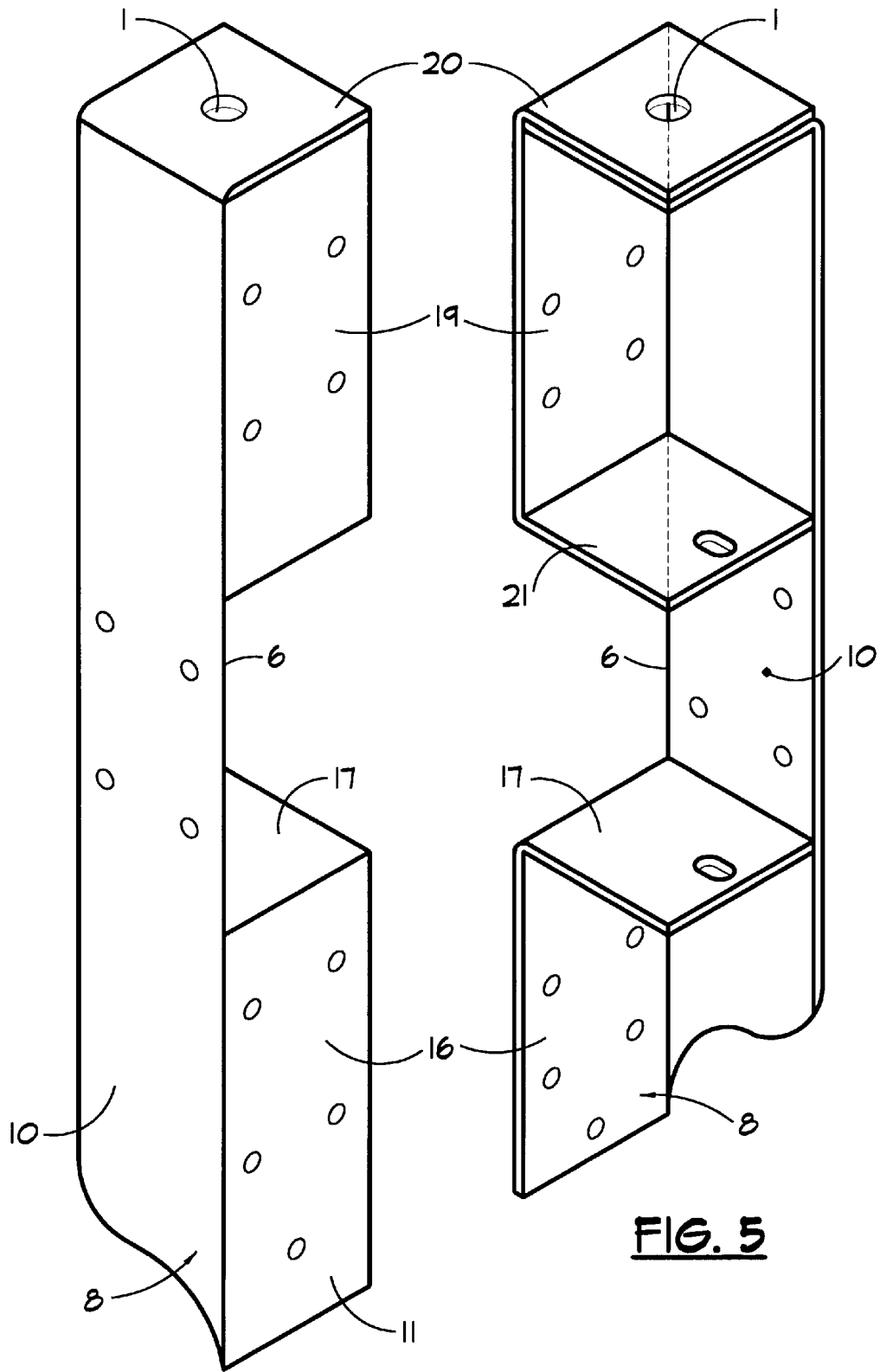
FIG. 4 shows a perspective view of a left sandwich.
FIG. 5 shows the rear perspective view of a left sandwich.

Refer now to FIG. 4 which shows a perspective view of left sandwich 8. The top tab 20 is at the top, the long side 10 is to the left, the top side tab 19 is to the upper right, the long bend 6 is at the center, and the bottom gusset 17 is at the top of the bottom side tab 16.

FIG. 5

Refer now to FIG. 5 which shows a perspective view of the rear of a left sandwich 8. The top tab 20 is at the top, the rear of the long side 10 is to the right, the rear of the top side tab 19 is to the upper left, the top gusset 21 is connected to the top side tab 19, the long bend 6 is at the center, and the bottom gusset 17 is at the top of the bottom side tab 16.

FIG. 6

Figure 6:
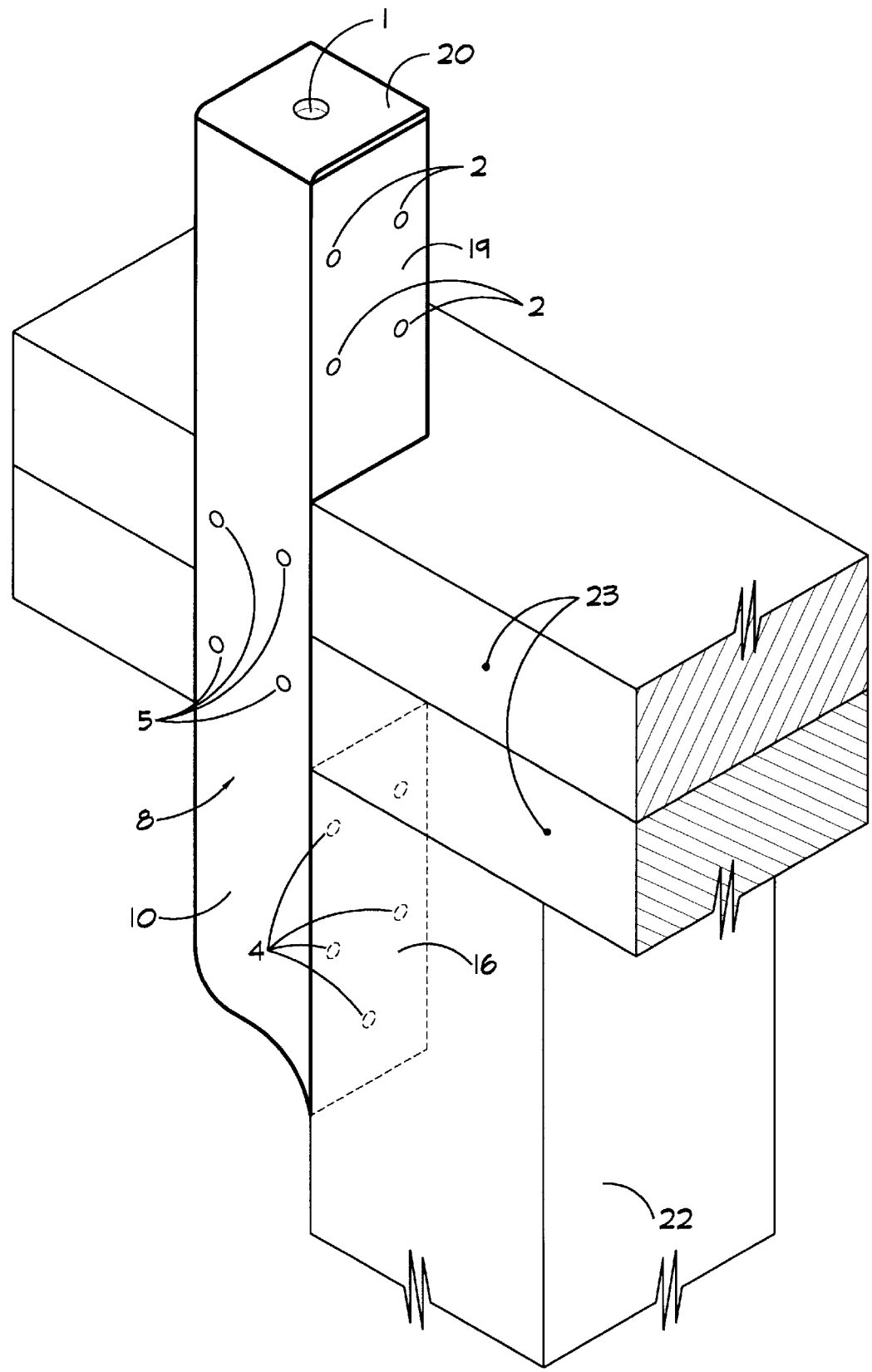
FIG. 6 shows a left sandwich attached to framing members.

Refer now to FIG. 6 which shows a perspective view of a left sandwich 8 attached to structural elements of a house. The top tab 20 is at the top, and the long side 10 is to the left, attached to the top plate 23 by nails through nail holes 5.

The top side tab 19 is attached to a rafter or roof truss (not shown in this figure for clarity) by nails through nail holes 2. The bottom side tab 16 (dashed because it is hidden by the wall stud) is attached to the wall stud 22 by nails through nail holes 4.

FIG. 6A

Figure 6A:
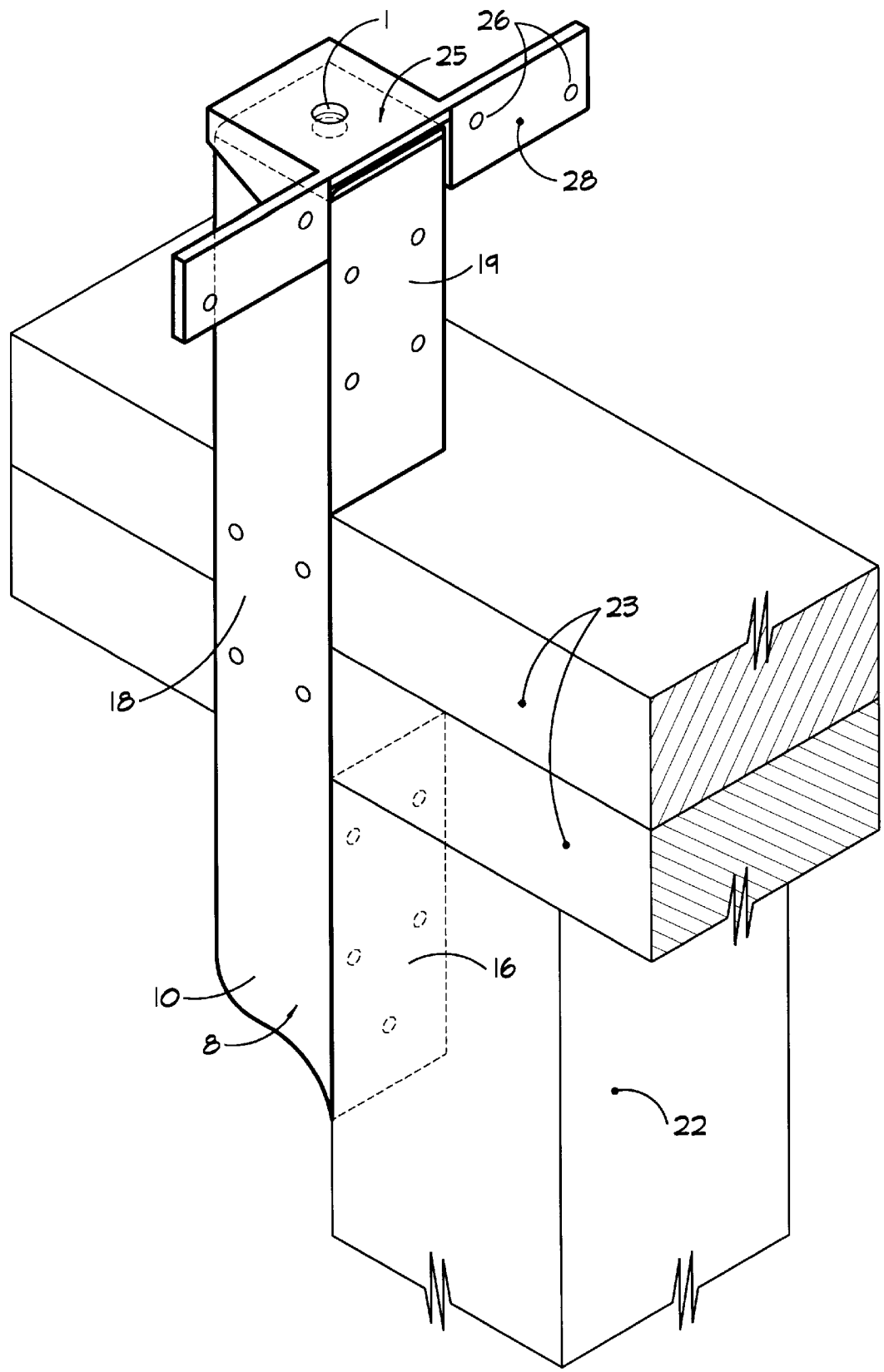
FIG. 6A shows a left sandwich and loader on framing members.

Refer now to FIG. 6A which shows a perspective view of a left sandwich 8 attached to structural elements of a house. The sandwich 8 has a topper 25 placed on top of the top tab 21. The topper 25 has wings 28, with nail holes 26 for attachment to a rafter or roof truss. The wings 28 give added strength against thrust movements and twisting as when heavy tiles are placed on a roof or for snow loads.

FIG. 7

Figure 7:
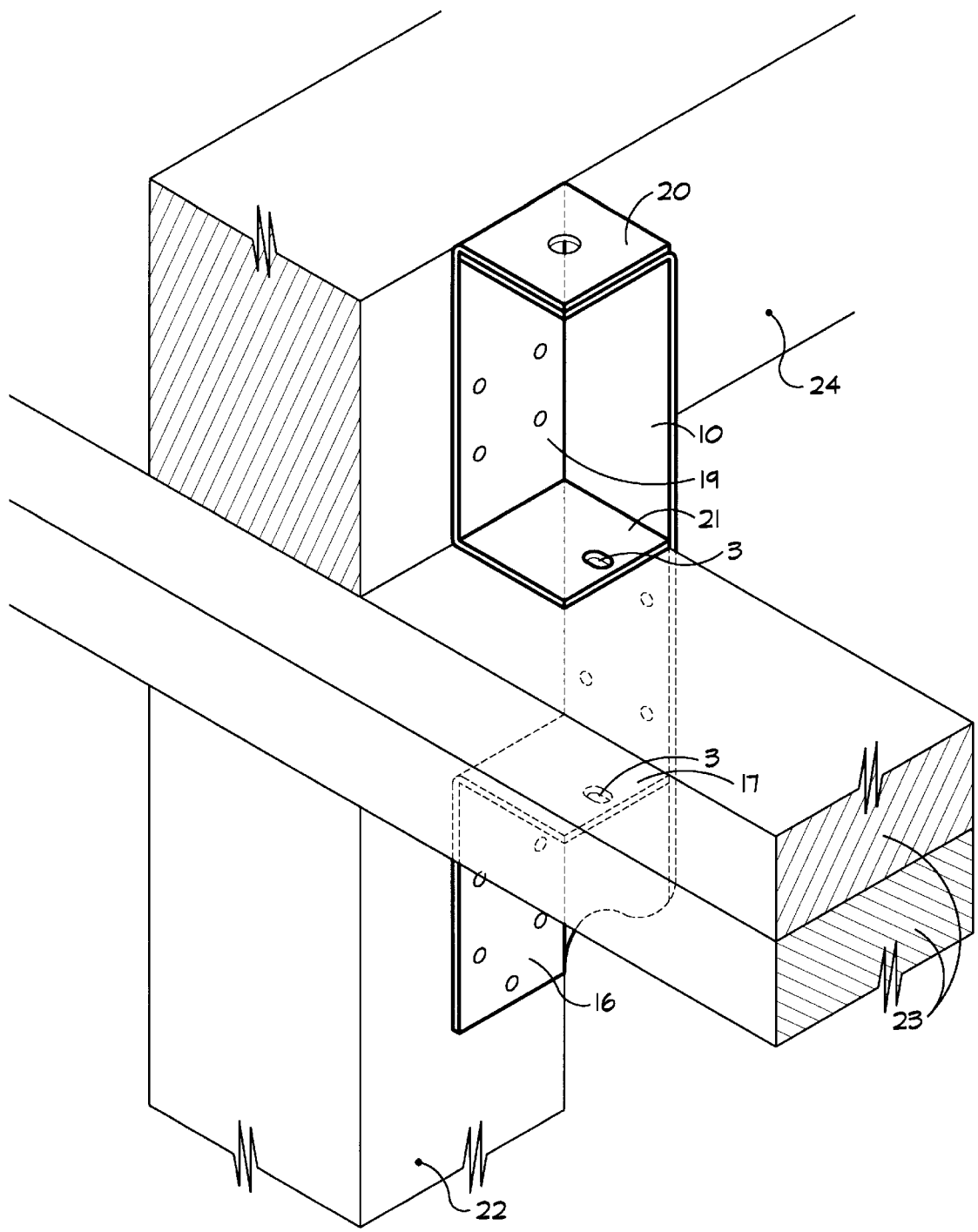
FIG. 7 shows a left sandwich on the inside of framing members.

Refer now to FIG. 7 which shows a rear perspective view of a left sandwich 8 attached to the inside part of the structural members of a house. The top side tab 19 is attached to a rafter 24 and the top gusset 21 is attached to the top plate 23 with a nail through the slot hole 3 for easy nailing.

The sandwich 8 is easily mounted to the structural members of a house from the inside or outside of a house. The sandwich and related hardware can be installed when the house is being built or can be retrofit later with only minimal demolition of existing trim. The sandwich 8 is then covered with sheathing on the outside of a house, or with gypsum on the inside of a house.

The bottom gusset 17 is attached to the bottom of the top plate 23 by a nail through the slot hole 3. This view shows how the structural elements of a house, the rafter, top plate, and wall stud are firmly held together.

The top plate 23 is shown attached to the sandwich 8 on three sides. This prevents the two 2×4's of the top plate from separating or twisting from uplift, thrust, or lateral loads. The rafter 24 is shown directly over the wall stud 22, making for direct loads to be transferred from the roof to the foundation.

FIG. 8

Figure 8:
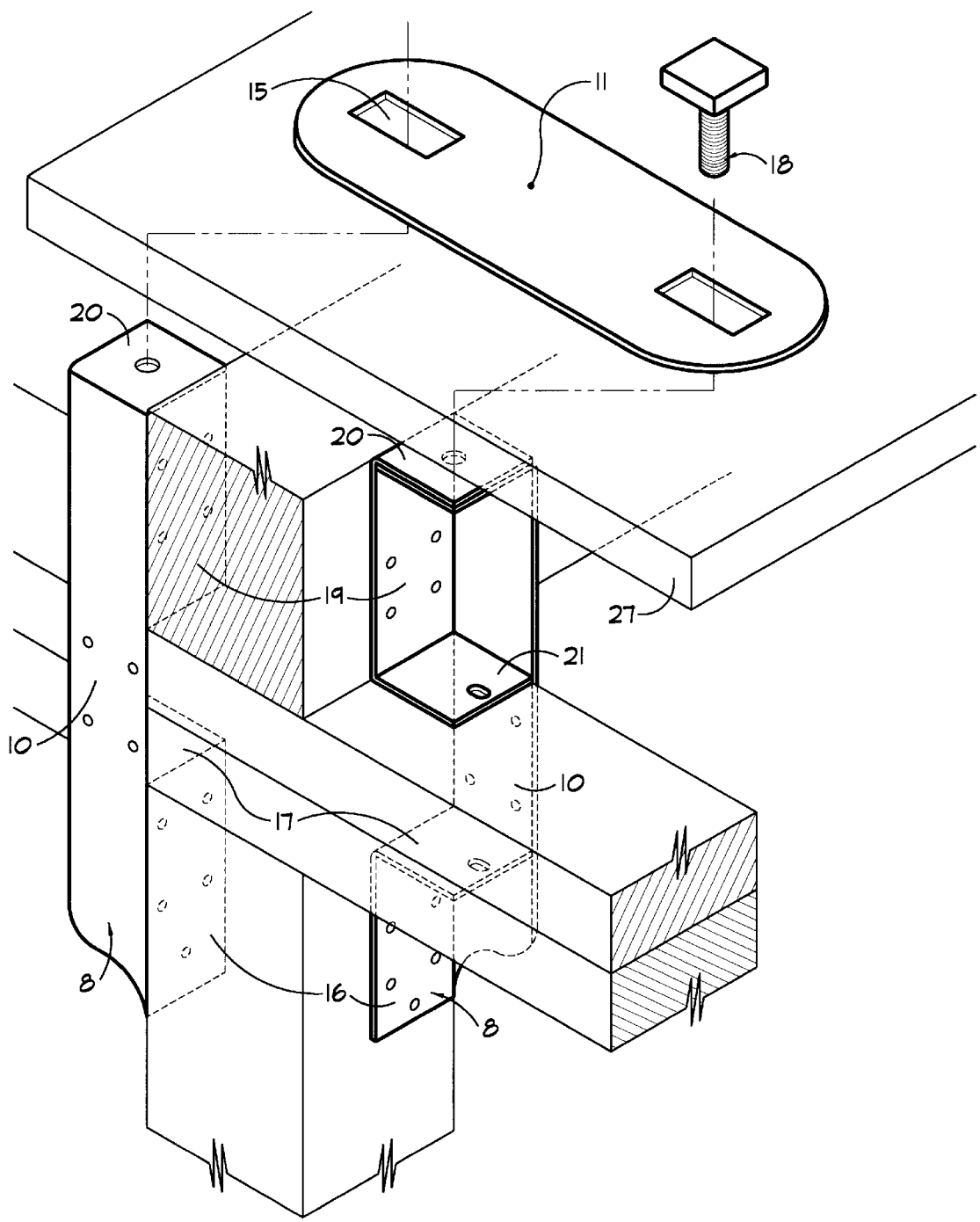
FIG. 8 shows two left sandwiches on the inside and outside framing members and roof sheathing.

Refer now to FIG. 8 which shows two left sandwiches 8 installed on the inner and outer parts of the structural members of a house. For added protection, a sheathing tie 11 can be attached to the sandwich 8 to tie down the roof sheathing 27.

This view shows a sheathing tie 11 attached to the top of the roof sheathing 27 by a carriage bolt 18. The carriage bolt 18 is installed from the top of the roof, down through the carriage bolt hole 15 on the sheathing tie 11, down through a drilled hole in the roof sheathing 27, down through the bolt hole 1 on the top tab 20 and secured by a nut and washer from between the top tab 20 and top gusset 21.

The rectangular carriage bolt holes 15 allow the carriage bolt 18 to enter and have some adjustment, but not spin. The square shank on the carriage bolt 18 prevents spinning and allows the installer to drop the carriage bolts 18 through the carriage bolt holes 15 and tighten them from below without anyone holding them on the roof. The rectangular shaped carriage bolt holes 15 allows for adjustment so the carriage bolts 18 will align with the bolt holes 1 on the top tab 20. The sheathing tie 11 is flat.

FIG. 9

Refer now to FIG. 9 which shows a perspective view of a topper 25. The top web 30 has a bolt hole 31 that can accommodate a carriage bolt 18. A right angle bend, the topper bend 32 forms the side gusset. The wings 28 are on either side of the top web 30, and are connected to the side gusset 29 by a right angle wing bend 33.

FIG. 9A

Refer now to FIG. 9A which shows a flat pattern layout of a topper 25. Shown is the wing 28, nail hole 26, side gusset 29, top web 30, bolt hole 31, wing bend 33, and topper bend 32, prior to bending.

FIG. 9B

Refer now to FIG. 9B which shows a front view of topper 25. Shown is the wing 28, nail hole 26, side gusset 29, and top web 30.

FIG. 9C

Refer now to FIG. 9C which shows a top view of a topper 25. Shown is the wing 28, top web 30, and bolt hole 30.

FIG. 9D

Refer now to FIG. 9D which shows a side view of a topper 25 showing the side gusset 29 and wing 28.

FIG. 9E

Refer now to FIG. 9E which shows a perspective view of a topper 25 from the rear. The topper 25 is placed on top of a sandwich 8, as shown in FIG. 6A, to strengthen the rafter connection. A sheathing tie 11 can also be used with the topper 25 and sandwich 8 to gain more strength.

FIG. 10

Figure 10:
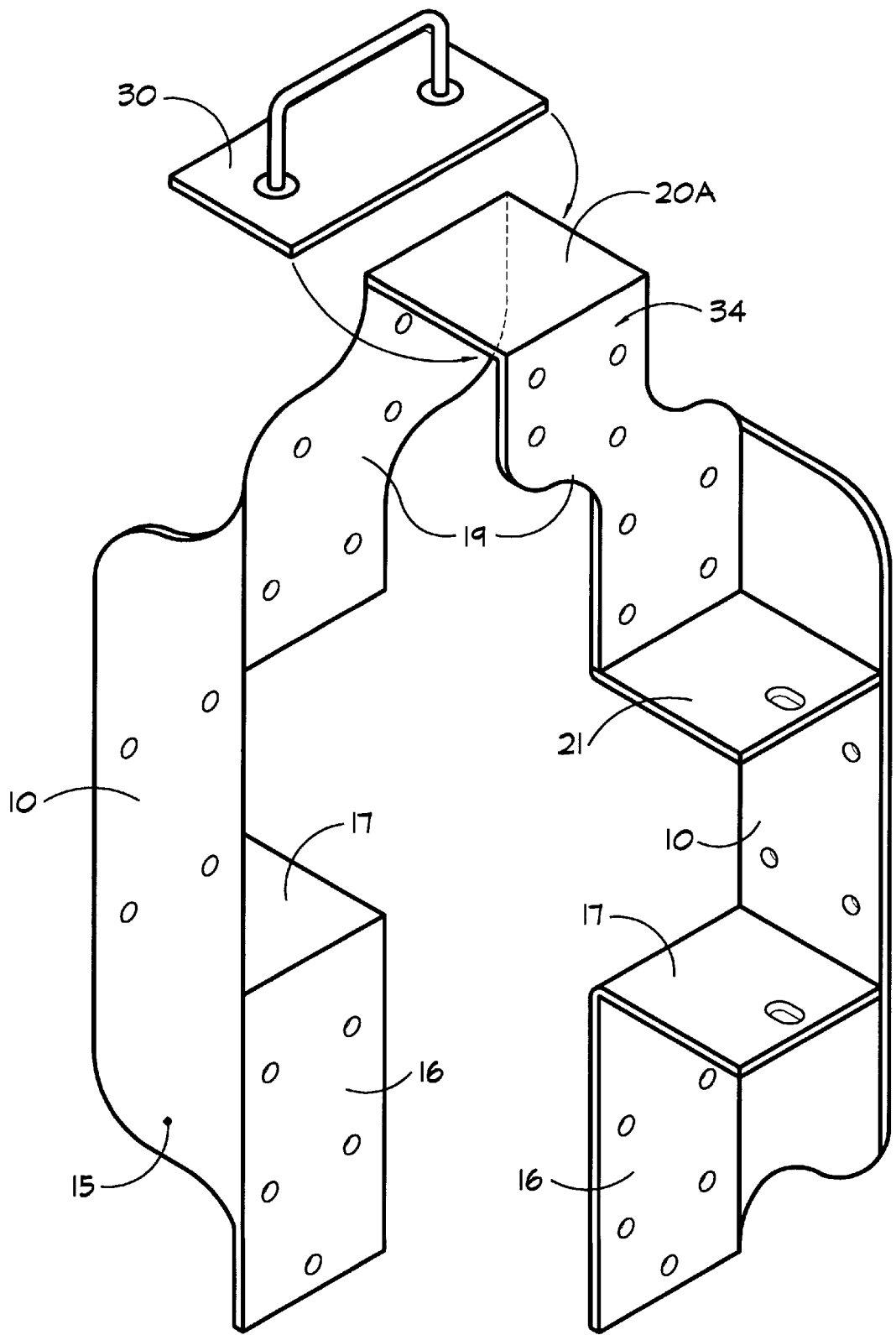
FIG. 10 shows a perspective view of a one-piece sandwich.

Refer now to FIG. 10 which shows a one-piece sandwich 34. The one-piece sandwich 34 incorporates two left or two right sandwiches 8 together. This view shows two left sandwiches 8 connected at the top tabber 20A to form a one-piece sandwich 34. All the other parts of the one-piece sandwich 34 are similar to the sandwich 8. The advantage of the one-piece sandwich 34 is that it can wrap around a rafter.

FIG. 11

Figure 11:
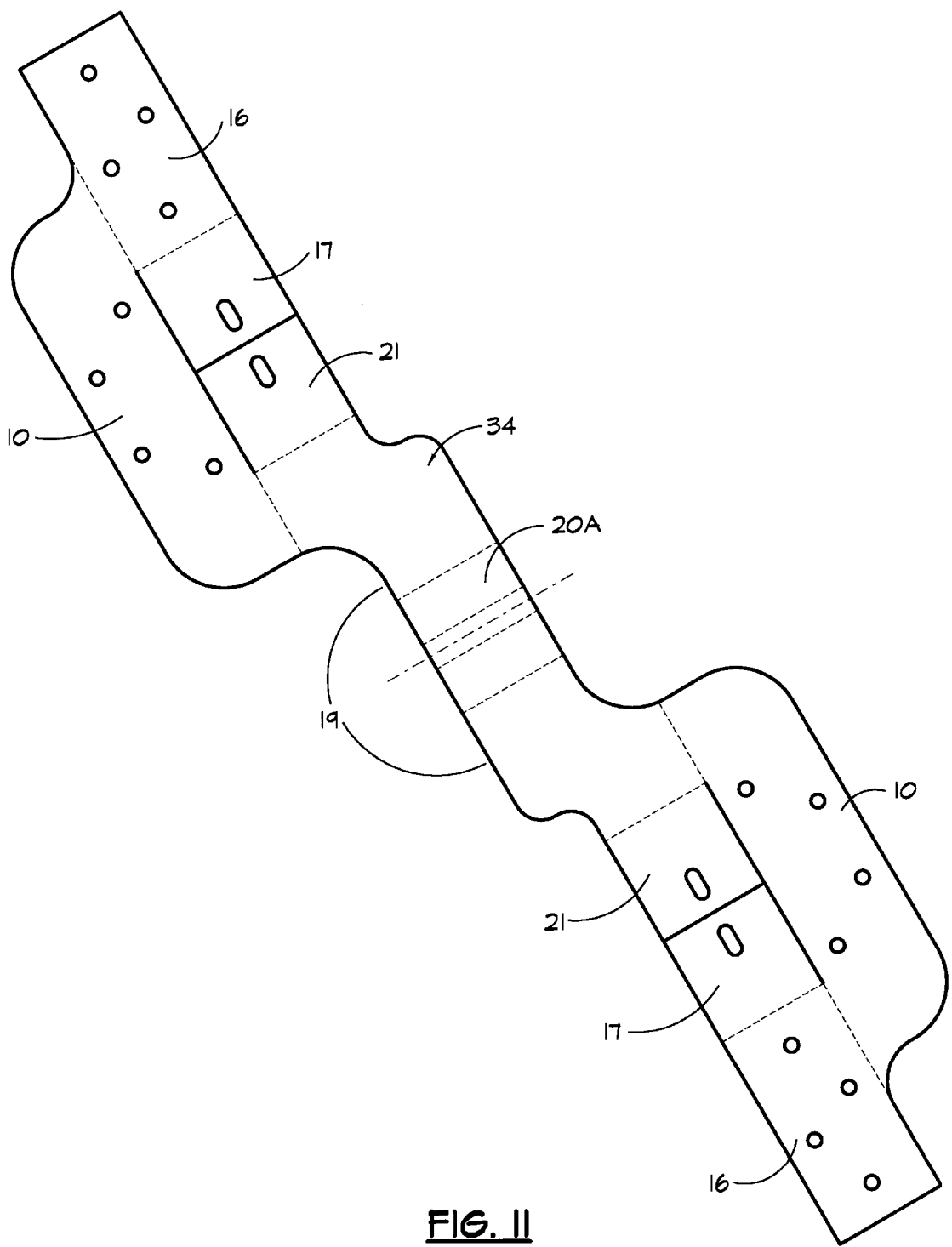
FIG. 11 shows a flat pattern layout of a one-piece sandwich.

Refer now to FIG. 11 which shows a flat pattern layout of a one-piece sandwich 34 prior to bending.

FIG. 12

Figure 12:
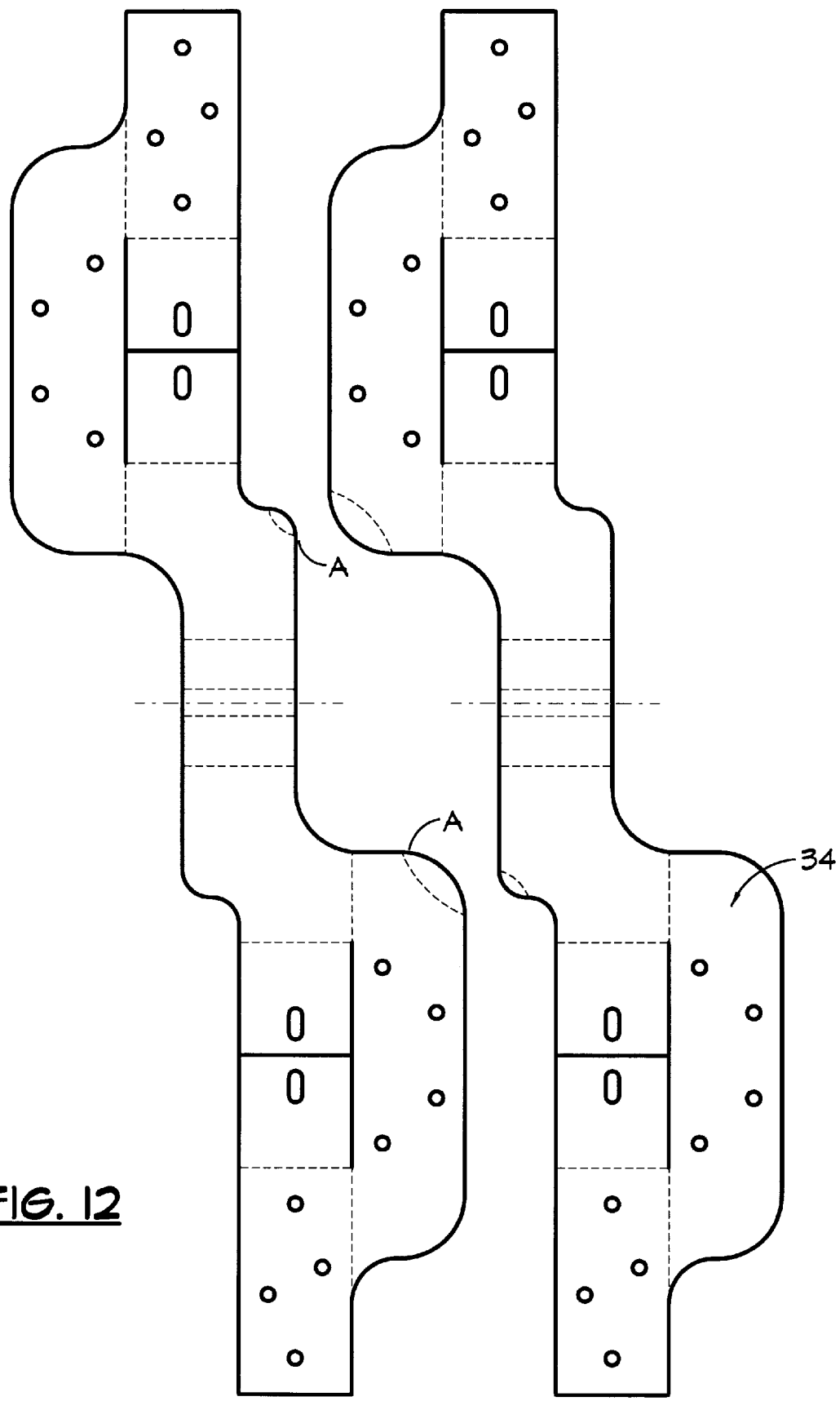
FIG. 12 shows a flat pattern layout and nesting.

Refer now to FIG. 12 which shows how the one-piece sandwich 34 can nest for forming by trimming small pieces (A). By nesting pieces close to each other, metal is saved during the forming process.

FIG. 13

Figure 13:
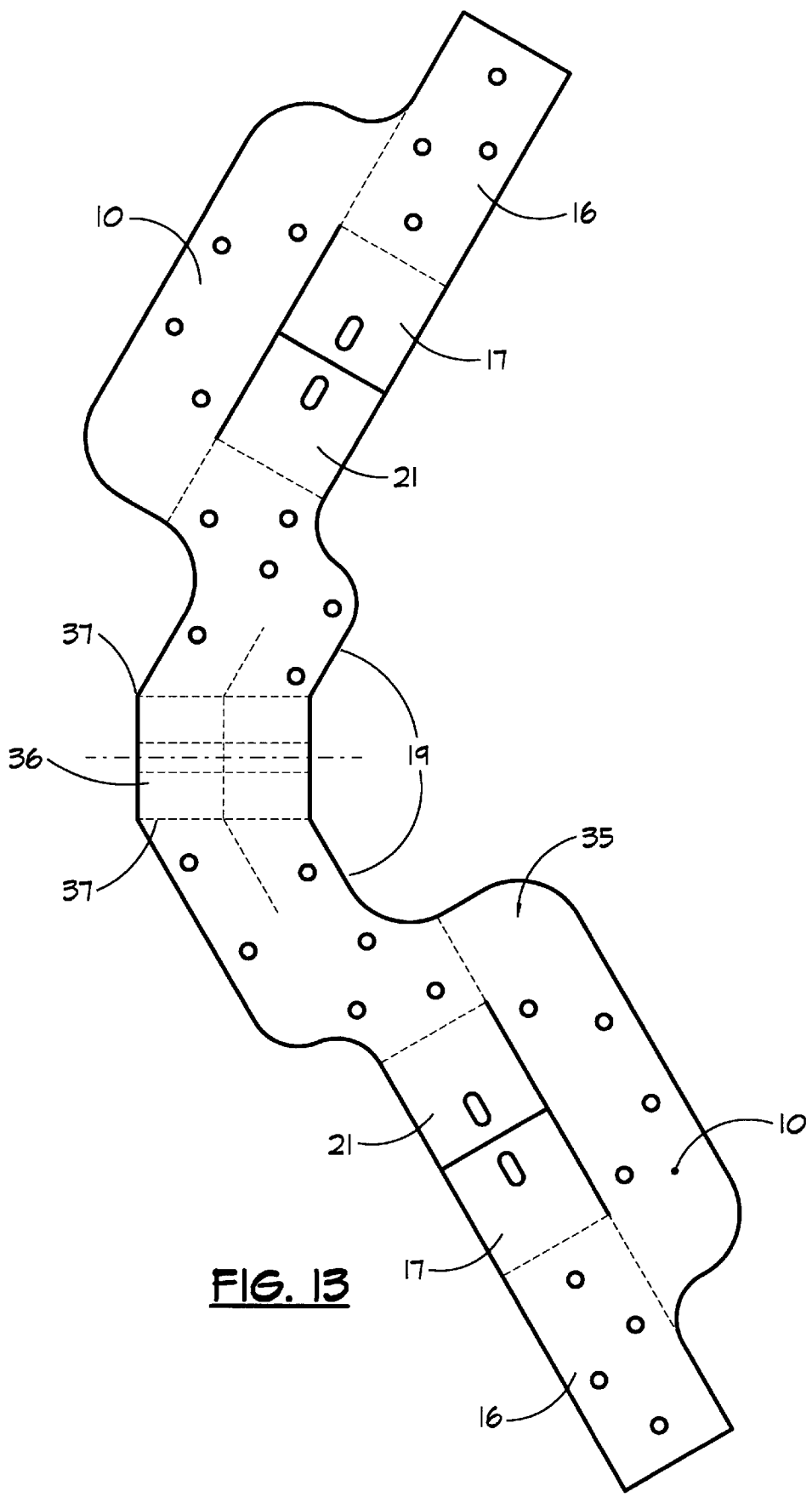
FIG. 13 shows a flat pattern layout of an angled one-piece sandwich.

Refer now to FIG. 13 which shows a flat pattern layout of an angled one-piece sandwich 35. The angled one-piece sandwich 35 can wrap on top of a rafter or roof truss. The crest 36 would be on top of the rafter, and the right angled angled bends 37 would bend the top side tabs 19 alongside the rafter, and the rest of the angled one-piece sandwich 35 would attach to the structural elements similar to the sandwich 8 as shown in FIG. 8.

FIG. 14

Figure 14:
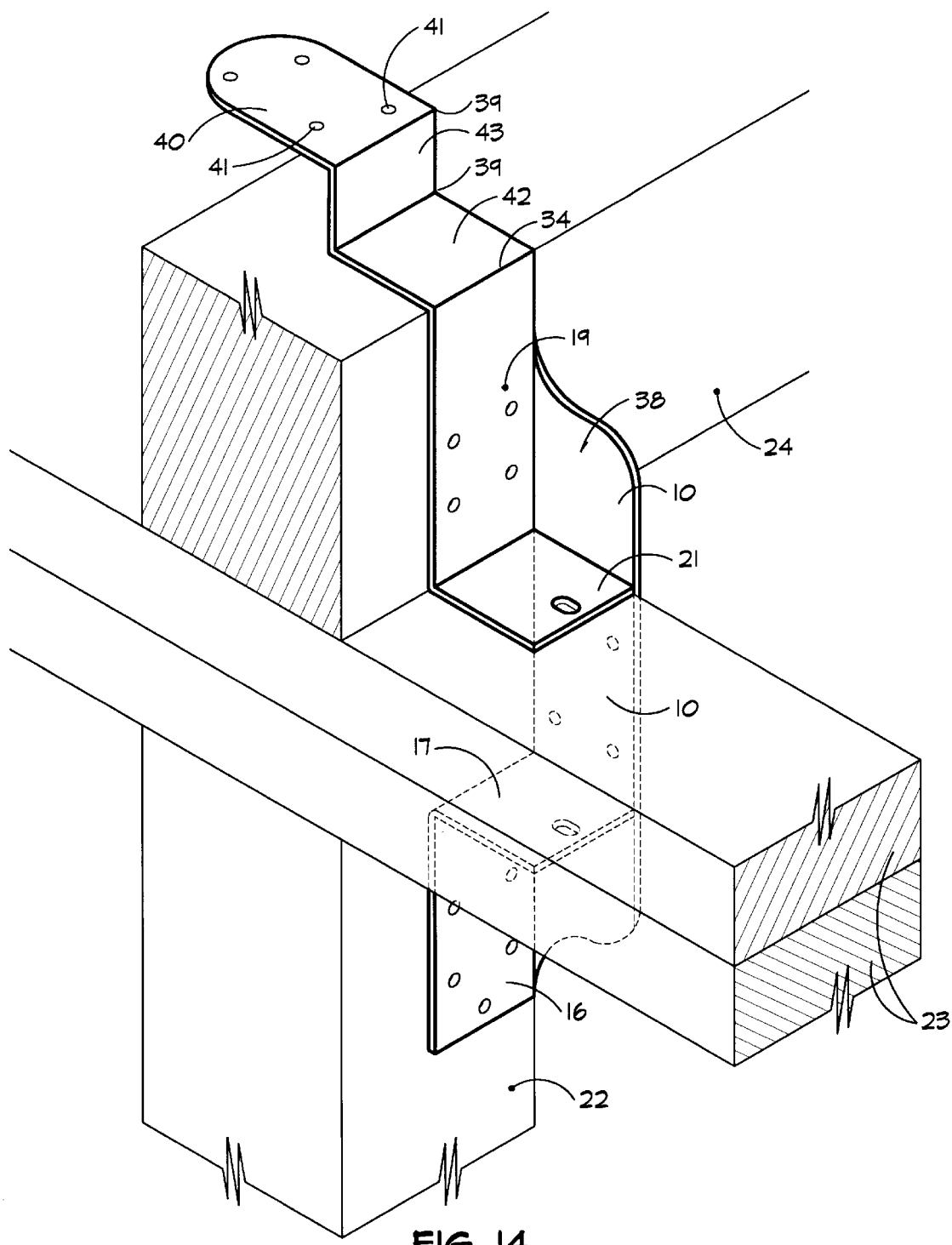
FIG. 14 shows a perspective view of a sandwich sheathing tie.

Refer now to FIG. 14 which shows a sandwich sheathing tie 38. From the top side tab 19 and down, the sandwich sheathing tie is similar to a sandwich 8.

The top part of the sandwich sheathing tie 38 has a series of right angle bends, the sheathing bends 39, and a sheathing tab 40. The sheathing tab 40 has nail holes 41 for attachment to the roof sheathing 27. The first sheathing bend 39 forms a span 42, the second sheathing bend 39 forms a riser 43, and the top sheathing bend 39 forms the sheathing tab 40.

Operation of the sandwich sheathing tie 38 is simple, as below the top side tab 19, attachment to the rafter 24, top plate 23, and wall stud 22 is similar to the sandwich 8.

On top of the sandwich sheathing tie 38, roof sheathing is slid under the sheathing tab 40 and secured with nails through nail holes 41. The thickness of the riser 43 spaces the sheathing 27 correctly, and the height of the riser 43 holds the sheathing 27 for nailing. The width of the span 42 positions the sheathing 27 correctly on the midpoint of the rafter 24.

FIG. 15

Figure 15:
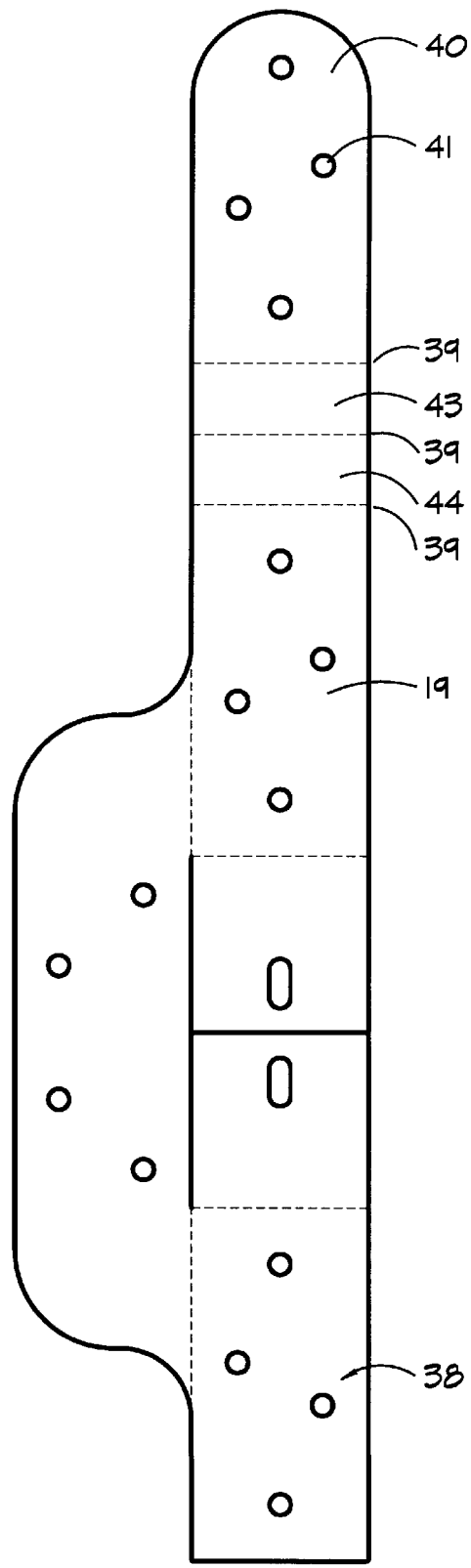
FIG. 15 shows a flat pattern layout of a sandwich sheathing tie.

Refer now to FIG. 15 which shows a flat pattern layout for a sandwich sheathing tie 38 prior to bending.

FIG. 16

Figure 16:
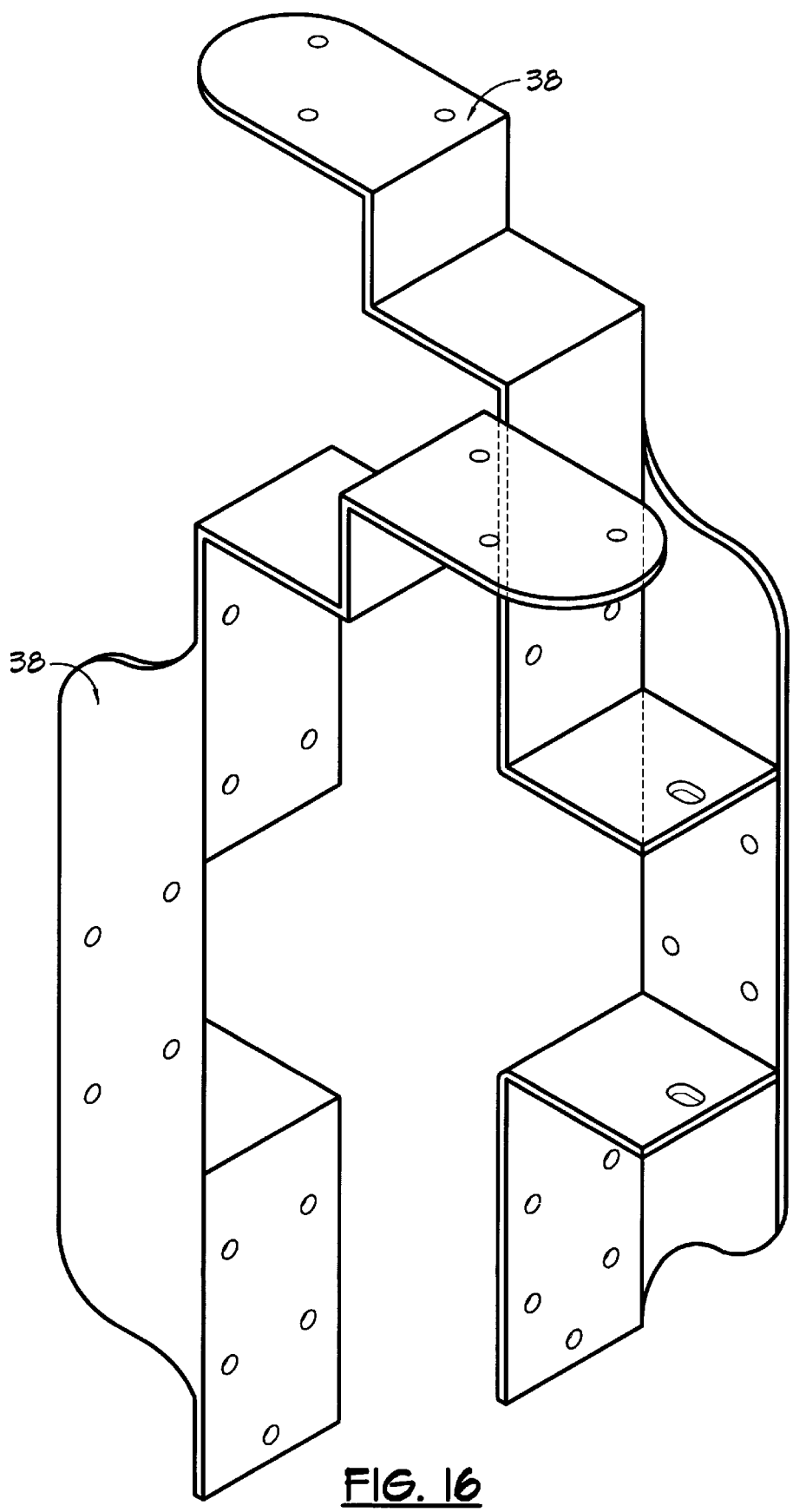
FIG. 16 shows a perspective view of two sandwich sheathing ties.

Refer now to FIG. 16 which shows how a sandwich sheathing tie 38 can tie down two adjacent roof sheathing sheets 27. The left sandwich sheathing tie 38 would tie down sheathing 27 to the right, and the left sandwich sheathing tie 38 on the right, would tie down sheathing 27 on the left.

FIG. 17

Figure 17:
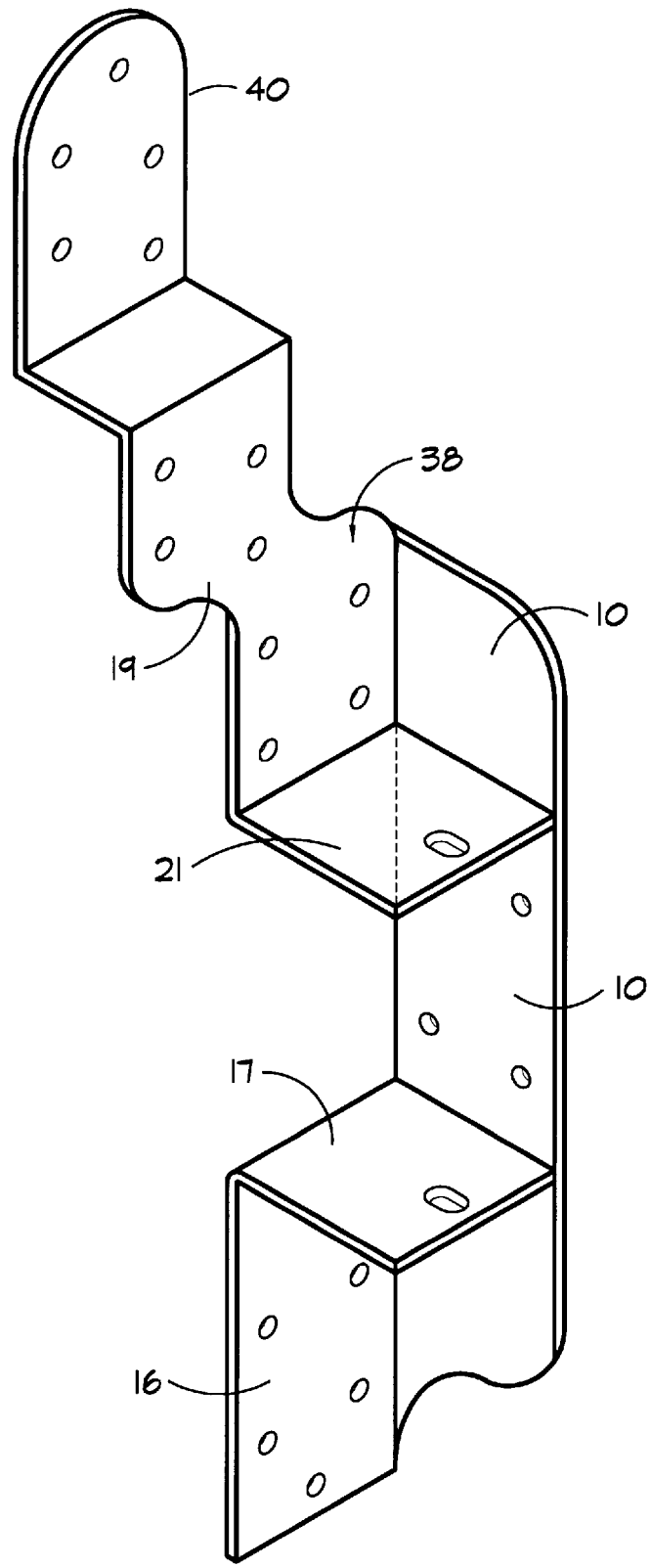
FIG. 17 shows a perspective view of a sandwich sheathing tie.

Refer now to FIG. 17 which shows a sandwich sheathing tie 38 with the sheathing tab 40, being bent by the framer on the house to conform to the thickness of the sheathing being applied to the house.

FIG. 18

Figure 18:
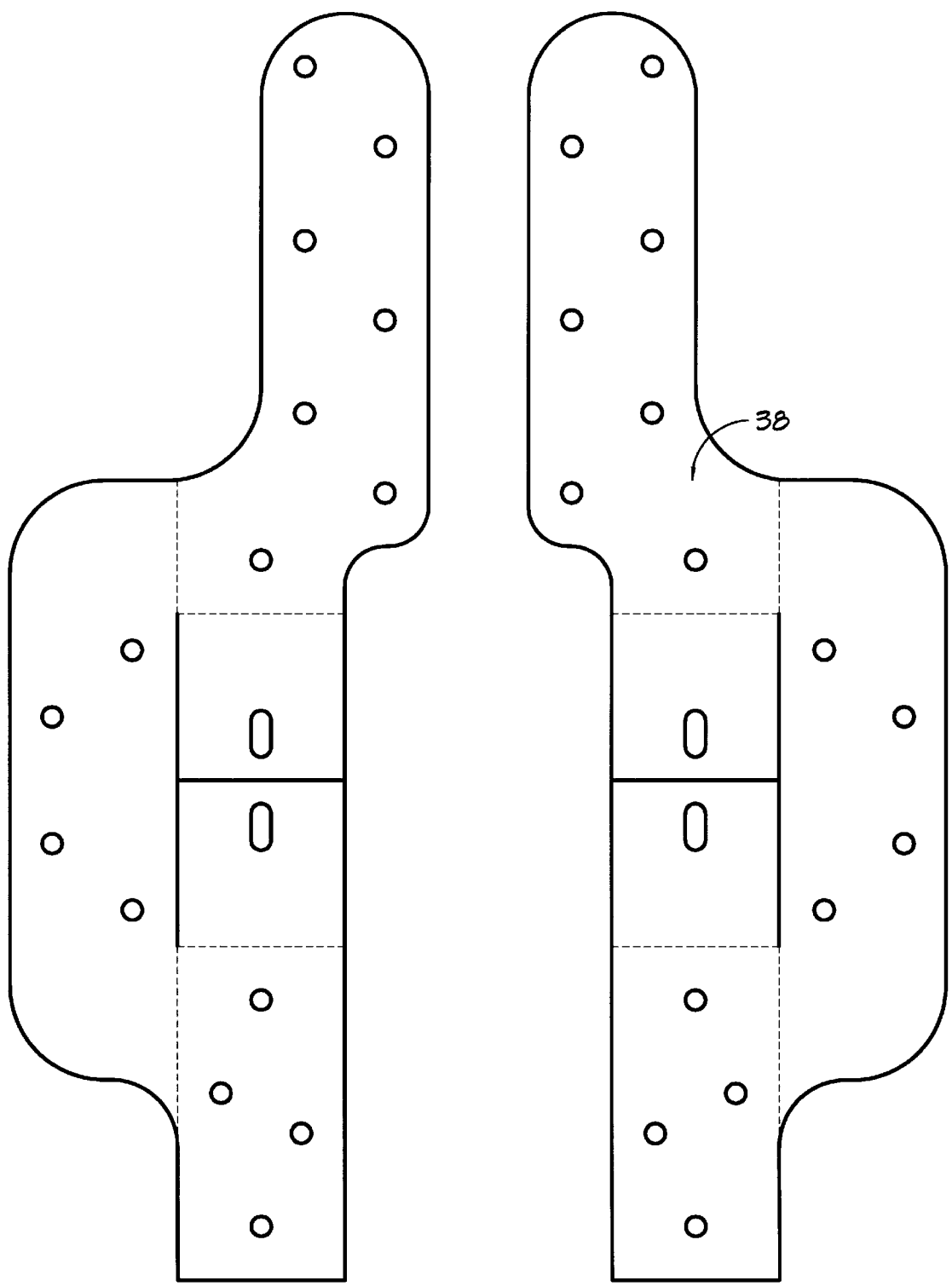
FIG. 18 shows a flat pattern layout of a left and right sandwich sheathing ties.

Refer now to FIG. 18 which shows a flat pattern layout for a left and right sandwich sheathing tie 38.

CONCLUSION, RAMIFICATIONS, AND SCOPE

Thus, the reader will see that the roof and wall tie of the invention provides a simple and economical connector that allows a builder to quickly, easily, and accurately secure weak parts of a building against earth tremors and high winds.

While my above description contains many specificities, these should not be construed as limitations on the scope of the invention, but rather as an exemplification of one preferred embodiment thereof. Many other variations are possible.

There can be minor variations in size, and materials. For example, the ties can have more rounded corners, squarer corners, wavy lines instead of straight lines, more nail holes, slightly less nail holes, or be thicker or thinner, wider or longer. The ties can be made for 2×4's, 2×6's, 2×8's, trusses, glue-lams, timbers, logs, beams, and other structural member combinations.

The ties can have different dimensions to fit the particular plans of the engineer and architect. In areas that have high winds or earthquakes, the ties could be thicker, wider, or have more nail holes. There could be more or less ties on each sheet, depending on the size of the sheet.

The ties can hold down boards instead of sheathing; they can also hold down insulated sheets or metal sheets. In instances where the rafters are warped, twisted, or bowed, the ties can help straighten them by securing the plywood down tightly with screws. On rough or un-planed boards, timbers, or beams, the ties, by wrapping around the timbers, form a secure connection to the roof sheathing.

The ties can be stamped as mirror images of the flat pattern layouts, for example, creating a tie with the ribs on reversed sides.

The ties can be made of metal by stamping, forging, or casting. The ties can be made of plastic, by molding or casting. The ties can be made of recycled materials. The ties can be made with bright colors, so a builder or inspector knows they are in position.

Accordingly, the scope of the invention should be determined not by the embodiments illustrated, but by the appended claims and their legal equivalents.

I claim:

1. Apparatus for securing structural members of a building together comprising:
   a unitary body having first and second long sides, approximately right angled bends, and gussets;
   said first and second long sides having said right angled bends between them forming said first long side approximately perpendicular to said second long side;
   said second long side having a middle part which is divided and bent to provide said gussets, said second long side and said gussets having said right angled bends between them forming said gussets generally parallel to each other and perpendicular to said second long side and said first long side;
   said gussets dividing said apparatus into a top section, a middle section and a bottom section, each section having a box shape for providing rigidity between said structural members,
   wherein said bottom section includes a bottom part of said first long side, a bottom part of said second long side, and a bottom one of said gussets;
   wherein said middle section includes a middle part of said first long side, said bottom one of said gussets, and a top one of said gussets;
   wherein said top section includes a top part of said first long side, a top part of said second long side, and said top one of said gussets, the top section further including first and second top tabs joined to tops of the first and second long sides, respectively, by said right angled bends forming the top tabs approximately perpendicular to both the first and second long sides;
   and, further comprising a plurality of nail holes for attaching said apparatus to said structural members.

2. The apparatus of claim 1, wherein said bottom part of said second long side has nail holes and a flat surface for attachment to a wall stud, the box shape of the bottom section for positioning against said wall stud and a lower member of a top plate for providing strength and preventing detachment from other said structural members.

3. The apparatus of claim 1, wherein the box shape of the middle section is for positioning against a top plate for providing strength and preventing detachment from other said structural members.

4. The apparatus of claim 1, wherein said top part of said second long side has nail holes and a flat surface for attachment to a side of a rafter, the box shape of the top section for positioning against said rafter and an upper member of a top plate for providing strength and preventing detachment from other said structural members.

5. The apparatus of claim 1, wherein the box shapes of the top section, middle section, and bottom section form box structures for preventing uplift, thrust, and racking forces to a building during wind and seismic events.

6. The apparatus of claim 1 further including:
   a hole of predetermined opening in said top tabs for allowing a bolt to pass at different angles;
   a sheathing tie having a broad flat surface for lying flat on top of roof sheathing and having at least one bolt hole for accepting said bolt;
   at least one bolt and nut;
   wherein said bolt is adapted to pass through said top tabs, through roof sheathing, and through said sheathing tie for holding said sheathing securely to rafters, a top plate, and wall studs with the nut.

7. Apparatus for securing structural members of a building together comprising:
   a unitary body having first and second long sides, approximately right angled bends, and gussets;
   said first and second long sides having said right angled bends between them forming said first long side approximately perpendicular to said second long side;
   said second long side having a middle part which is divided and bent to provide said gussets, said second long side and said gussets having said right angled bends between them forming said gussets generally parallel to each other and perpendicular to said second long side and said first long side;
   said gussets dividing said apparatus into a top section, a middle section and a bottom section, each section having a box shape for providing rigidity between said structural members,
   wherein said bottom section includes a bottom part of said first long side, a bottom part of said second long side, and a bottom one of said gussets;
   wherein said middle section includes a middle part of said first long side, said bottom one of said gussets, and a top one of said gussets;
   wherein said top section includes a top part of said first long side, a top part of said second long side, and said top one of said gussets, the top section further including a sheathing tab extending from a top of said top part of said second long side by a said right angled bend, said sheathing tab adapted to form a span along a top part of a rafter, said sheathing tab further including another said right angled bend forming a riser, said riser adapted to be positioned near the approximate center of said rafter, and another said right angled bend to place the sheathing tab approximately parallel to said span and perpendicular to said riser;

and, further including nail holes for attaching the apparatus to said structural members.

8. The apparatus of claim 7, wherein said sheathing tab includes said nail holes and includes a surface area for attaching roof sheathing to rafters, a top plate, and a wall stud and for preventing lifting and splitting of said sheathing.

\* \* \* \* \*